United States Patent
Nakagawa (10) Patent No.: US 11,949,810 B2
(45) Date of Patent: Apr. 2, 2024

(54) IMAGE FORMING APPARATUS THAT CALLS TERMINAL DEVICE ON OTHER END INDICATED BY PREDETERMINED DESTINATION NUMBER, WHEN PRESPECIFIED GESTURE IS DETECTED

(71) Applicant: KYOCERA Document Solutions Inc., Osaka (JP)

(72) Inventor: Hiroshi Nakagawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 65 days.

(21) Appl. No.: 17/591,995

(22) Filed: Feb. 3, 2022

(65) Prior Publication Data

US 2022/0256030 A1  Aug. 11, 2022

(30) Foreign Application Priority Data

Feb. 9, 2021  (JP) .................. 2021-019182

(51) Int. Cl.
H04M 3/00 (2006.01)
G06F 3/01 (2006.01)
H04M 3/02 (2006.01)

(52) U.S. Cl.
CPC .............. *H04M 3/02* (2013.01); *G06F 3/017* (2013.01)

(58) Field of Classification Search
CPC .......... G06F 3/017; H04M 3/02; H04M 3/04; H04M 3/06
See application file for complete search history.

(56) References Cited

U.S. PATENT DOCUMENTS

2015/0181065 A1  6/2015  Aizono
2022/0350416 A1* 11/2022  Agrawal ............... G06F 3/0346

FOREIGN PATENT DOCUMENTS

JP  2001-331069 A  11/2001
JP  2015-123587 A  7/2015

* cited by examiner

*Primary Examiner* — Rasha S Al Aubaidi
(74) *Attorney, Agent, or Firm* — IP Business Solutions, LLC (57) ABSTRACT

A communication apparatus includes a motion sensor, a communication device, and a control device. The motion sensor detects a gesture of a user. The communication device makes communication with a terminal device on another end, through a predetermined communication network. The control device acts as a controller. The controller causes the communication device to dispatch a call to the terminal device, when the motion sensor detects a prespecified gesture, in a state where a predetermined condition is satisfied.

5 Claims, 4 Drawing Sheets

| TYPE OF ERROR | |
|---|---|
| ERROR A | IMAGE REPRESENTING PROCEDURE FOR FIXING ERROR A, AND PHONE NUMBER OF MAINTENANCE STAFF |
| ERROR B | IMAGE REPRESENTING PROCEDURE FOR FIXING ERROR B, AND PHONE NUMBER OF MAINTENANCE STAFF |
| ERROR C | IMAGE REPRESENTING PROCEDURE FOR FIXING ERROR C, AND PHONE NUMBER OF MAINTENANCE STAFF |
| ERROR D | IMAGE REPRESENTING PROCEDURE FOR FIXING ERROR D, AND PHONE NUMBER OF MAINTENANCE STAFF |

IMAGE FORMING APPARATUS THAT CALLS TERMINAL DEVICE ON OTHER END INDICATED BY PREDETERMINED DESTINATION NUMBER, WHEN PRESPECIFIED GESTURE IS DETECTED

INCORPORATION BY REFERENCE

This application claims priority to Japanese Patent Application No. 2021-019182 filed on Feb. 9, 2021, the entire contents of which are incorporated by reference herein.

BACKGROUND

The present disclosure relates to a communication apparatus and an image forming apparatus having a communication function, and in particular to a technique related to a procedure to cause the communication apparatus to start the communication.

Image forming apparatuses are known that are configured to execute a telephone or facsimile communication, in addition to a copying job including reading an image of a source document and forming the image on a recording sheet. Such an image forming apparatus dispatches, when the user inputs a telephone number or a facsimile number, a call to a communication terminal on the other end indicated by the telephone number or facsimile number, through a telephone network, and starts the phone communication or facsimile communication with the communication terminal on the other end, when the communication terminal on the other end answers the call.

When an error occurs with the image forming apparatus, the error has to be dealt with. For example, a first technique is known including displaying one of a maintenance screen and a contact address screen on a display device, when an error occurs during the execution of a printing job. According to the first technique, the maintenance screen is displayed on the display device, when a general user has logged in, and the contact address screen is displayed, when a coin user has logged in. The coin user can, for example, make a phone call in view of the contact address screen.

In addition, a second technique is known including writing in advance a contact address of the vendor in the memory of an IC card provided in a replaceable part, reading the contact address of the vendor from the memory when the time for replacement of the replaceable part draws near, and displaying the contact address of the vendor that has been read, on the display device. In view of display of the contact address of the vendor, the user can order the replaceable part, for example by telephone.

SUMMARY

The disclosure proposes further improvement of the foregoing technique.

In an aspect, the disclosure provides a communication apparatus including a motion sensor, a communication device, and a control device. The motion sensor detects a gesture of a user. The communication device makes communication with a terminal device on another end, through a predetermined communication network. The control device includes a processor, and acts as a controller when the processor operates according to a control program. The controller causes the communication device to dispatch a call to the terminal device indicated by a predetermined destination number, when the motion sensor detects a prespecified gesture, in a state where a predetermined condition is satisfied.

In another aspect, the disclosure provides an image forming apparatus including the foregoing communication apparatus, and an image forming device. The image forming device forms an image on a recording medium.

DETAILED DESCRIPTION

Hereafter, an image forming apparatus according to an embodiment of the disclosure will be described, with reference to the drawings.

Figure 1:
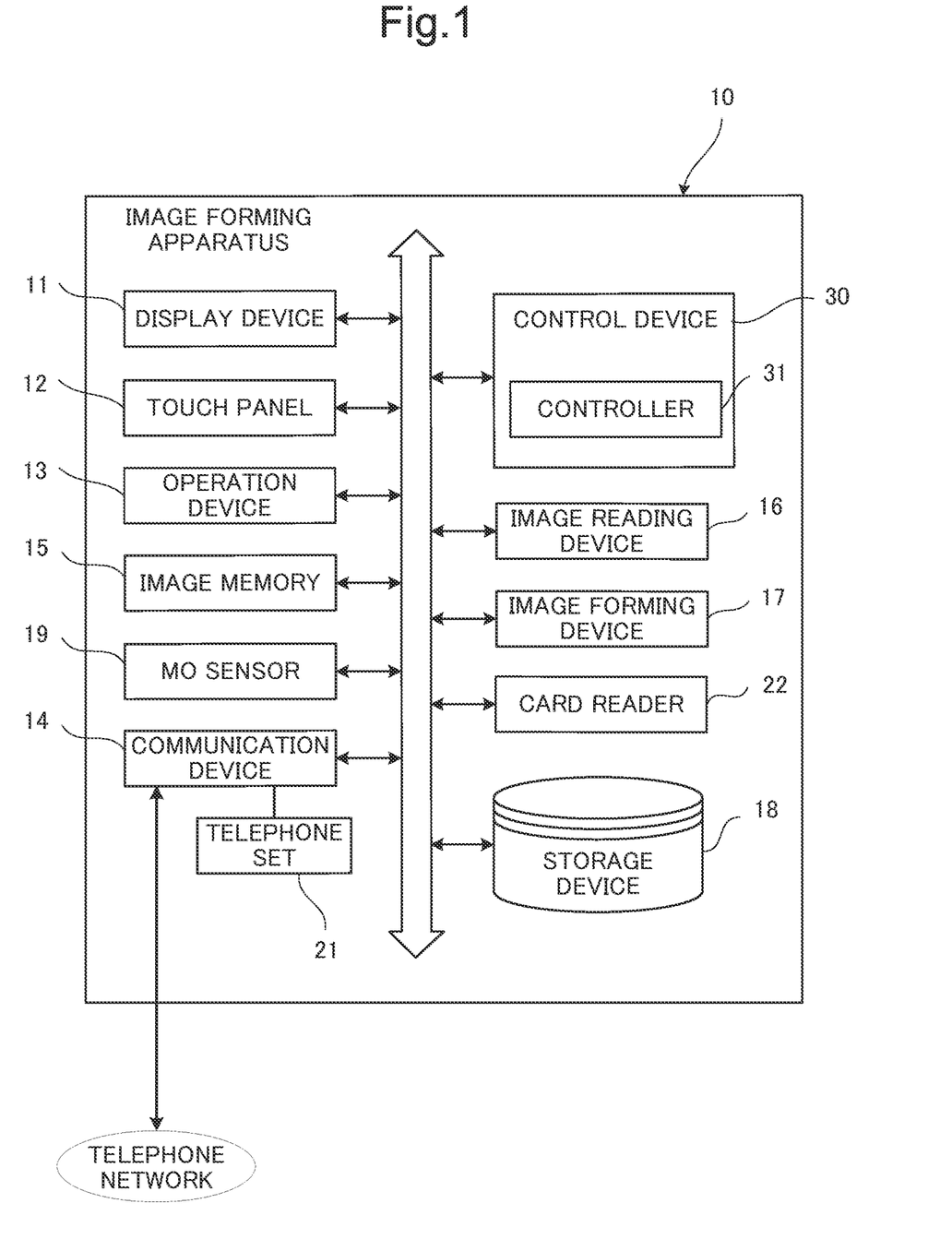
FIG. 1 is a block diagram showing an essential internal configuration of an image forming apparatus.

FIG. 1 is a block diagram showing an essential internal configuration of the image forming apparatus according to the embodiment of the disclosure. As shown in FIG. 1, this embodiment the image forming apparatus 10 according to this embodiment includes a display device 11, a touch panel 12, an operation device 13, a communication device 14, an image memory 15, an image reading device 16, an image forming device 17, a storage device 18, a motion sensor 19, a card reader 22, and a control device 30. The mentioned components are configured to transmit and receive data and signals to and from each other, via a bus.

The display device 11 is, for example, constituted of a liquid crystal display (LCD) or an organic light-emitting diode (OLED) display.

A touch panel 12 is overlaid on the screen of the display device 11. The touch panel 12 is based on a resistive film or electrostatic capacitance. The touch panel 12 detects a contact (touch) of the user's finger made thereon, along with the touched position, and outputs a detection signal indicating the coordinate of the touched position, to the control device 30. Therefore, the user can operate a graphical user interface (GUI) displayed on the screen of the display device 11, through the touch panel 12. The touch panel 12 serves as an operation device for the user to input instructions through the screen of the display device 11.

The operation device 13 includes physical keys such as a tenkey, an enter key, and a start key.

The image reading device 16 includes a scanner that optically reads an image of a source document placed on the contact glass. The image reading device 16 generates image data representing the image of the source document. The image data is stored in the image memory 15.

The image forming device 17 includes a photoconductor drum, a charging device that uniformly charges the surface of the photoconductor drum, an exposure device that exposes the surface of the photoconductor drum to light, thereby forming an electrostatic latent image on the surface of the photoconductor drum, a developing device that develops the electrostatic latent image on the surface of the photoconductor drum into a toner image, and a transfer device that transfers the toner image on the surface of the photoconductor drum onto a recording sheet, exemplifying the recording medium in the disclosure. The image forming device 17 prints the image represented by the image data in the image memory 15, on the recording sheet.

The communication device 14 is a communication interface including a communication module such as a local area network (LAN) chip. The communication device 14 makes communication with a terminal device (e.g., telephone set) on the other end, for example through a telephone network. For example, the communication device 14 dispatches a call via the telephone network, in response to an operation made on a telephone set 21 connected to the communication device 14, to the telephone set on the other end corresponding to the telephone number (exemplifying the destination number in the disclosure) designated through the operation on the telephone set 21, and allows the telephone set 21 to start communication with the telephone set on the other end, when the telephone set on the other end answers the dispatched call. The communication device 14 also allows the telephone set 21 and the telephone set on the other end to start the communication therebetween, upon receipt of an incoming call from the telephone set on the other end via the telephone network. The telephone set 21 may be, for example, a hands-free telephone set having a microphone and a speaker. The telephone network exemplifies the predetermined communication network in the disclosure. In this embodiment, the communication device 14 is also equipped with a facsimile communication function.

The motion sensor (MO sensor) 19 is a known motion sensor or a gesture sensor. The motion sensor 19 shoots an area in front of the image forming apparatus 10. The motion sensor 19 shoots the user standing in front of the image forming apparatus 10, and outputs the image data representing the image of the user to the controller 31. At the same time, the motion sensor 19 detects the distance between the motion sensor 19 and the user and outputs the distance to the user to the controller 31, thereby detecting a gesture of the user.

The card reader 22 is a known card reader. The card reader 22 reads a log-in password registered in the ID card owned by the user.

The storage device 18 is a large-capacity memory unit such as a solid-state drive (SSD) or a hard disk drive (HDD). The storage device 18 contains various application programs and various types of data.

The control device 30 includes a processor, a random-access memory (RAM), a read-only memory (ROM), and so forth. The processor is, for example, a central processing unit (CPU), a micro processing unit (MPU), or an application specific integrated circuit (ASIC). The control device 30 acts as the controller 31, when the processor executes a control program stored in the ROM or the storage device 18. The controller 31 serves to control the overall operation of the image forming apparatus 10.

The control device 30 is connected to the display device 11, the touch panel 12, the operation device 13, the communication device 14, the image memory 15, the image reading device 16, the image forming device 17, the storage device 18, the motion sensor 19, and the card reader 22. The controller 31 controls the operation of the mentioned components, and transmit and receive data and signals to and from each of those components.

The controller 31 serves as a processing device that executes an operation instructed by the user through the touch panel 12 or operation device 13. The controller 31 controls the displaying operation of the display device 11, and the communicating operation of the communication device 14.

Now, it will be assumed that the user has specified setting information for the copying job (color or B/W, number of copies, and so forth), by operating the GUI displayed on the screen of the display device 11 through the touch panel 12, or the inputting data through the operation device 13, set a source document on the image reading device 16, and pressed the start key of the operation device 13. In this case, the controller 31 causes the image reading device 16 to read the image of the source document and generate the image data representing the image of the source document, according to the setting information for the copying job, and stores the image data in the image memory 15. Then the controller 31 inputs the image data generated as above into the image forming device 17, and causes the image forming device 17 to form the image of the source document on the recording sheet.

It is also assumed here that the user has specified setting information for the facsimile job (telephone number of the facsimile machine on the receiving end, resolution, and so forth), by operating the GUI displayed on the screen of the display device 11 through the touch panel 12, set a source document on the image reading device 16, and pressed the start key of the operation device 13. In this case, the controller 31 causes the image reading device 16 to read the image of the source document and generate the image data representing the image of the source document, according to the setting information for the facsimile job, and stores the image data in the image memory 15. Then the controller 31 causes the communication device 14 to dispatch a call to the facsimile machine on the other end corresponding to the designated facsimile number (exemplifying the destination number in the disclosure). Upon receipt of the answer to the dispatched call, from the facsimile machine on the other end, the communication device 14 starts the facsimile communication with the facsimile machine on the other end via the telephone network, on the basis of a predetermined communication protocol, and transmits the image data, the object of the facsimile transmission, to the facsimile machine on the other end via the telephone network.

In addition, upon receipt of an incoming call from the facsimile machine on the other end via the telephone network, the communication device 14 starts, in response to the incoming call, the facsimile communication with the facsimile machine on the other end via the telephone network, on the basis of the predetermined communication protocol, and receives the image data transmitted from the facsimile machine on the other end, via the telephone network. The controller 31 stores the received image data in the image memory 15, and inputs the image data into the image forming device 17. The image forming device 17 forms the image represented by the image data inputted thereto, on the recording sheet.

As described above, the image forming apparatus 10 performs the telephone job, the copying job, and the facsimile job.

Now, an error may occur in the image forming apparatus 10, during the execution of the copying job or facsimile job. When it is necessary to make a phone call to the maintenance staff in charge of the image forming apparatus 10, to fix the error, it is preferable that the communication device 14 immediately dispatches a call to the telephone set of the maintenance staff via the telephone network, so that the communication through the telephone set 21 can be promptly started.

The foregoing first and second techniques provide an advantage in that the user is exempted from the trouble of finding out the telephone number of the maintenance staff.

However, the first and second techniques are designed on the premise that the user can immediately use his/her own telephone or a telephone available nearby, and therefore it may take longer to fix the error, in case the telephone is unavailable nearby.

Further, in the case where the image forming apparatus 10 is utilized by many and unspecified persons, it is undesirable that such persons carelessly touch various parts of the image forming apparatus 10, from the viewpoint of public hygiene, even though it is for the purpose of fixing the error.

In the image forming apparatus 10 according to this embodiment, in contrast, the controller 31 specifies in advance a condition that an error has occurred in the image forming apparatus 10, as a predetermined condition that permits a telephone call to be dispatched. Examples of the types of the error include paper jam, running out of the toner, malfunction of the image forming device 17, and malfunction of the image reading device 16. The controller 31 decides whether an error has occurred, according to detection outputs of a plurality of sensors provided in the image forming apparatus 10. Upon deciding that an error has occurred, the controller 31 decides that the predetermined condition has been satisfied, but decides that the predetermined condition has not been satisfied, when no error is detected. The controller 31 also specifies in advance the telephone number of the maintenance staff, as a predetermined telephone number corresponding to the predetermined condition.

When the motion sensor 19 detects a prespecified gesture in the state where the predetermined condition is satisfied, the controller 31 executes an error fixing process, including causing the communication device 14 to dispatch a call to the telephone set on the other end indicated by the predetermined telephone number, via the telephone network. Upon receipt of the answer to the dispatched call from the telephone set on the other end, the communication device 14 starts the communication between the telephone set 21 and the telephone set on the other end. Accordingly, the user can dispatch the call for making communication with the terminal device on the other end indicated by the predetermined telephone number, promptly and without contact, by performing a gesture. Therefore, the request for fixing the error can be promptly sent to the maintenance staff through the telephone, without the need for the user to touch the image forming apparatus 10.

The controller 31 analyzes the image of the user shot by the motion sensor 19, and the distance to the user detected by the motion sensor 19, to thereby detect the gesture performed by the user, and decides that the motion sensor 19 has detected the prespecified gesture, when the detected gesture accords with, or is approximate to the prespecified gesture.

Here, the motion sensor 19 may shoot the movement of the user standing in front of the image forming apparatus 10, in particular the movement of the user's hand, and output the shot image to the control device 30. In this case, controller 31 analyzes the image of the user shot by the motion sensor 19, and the distance to the user detected by the motion sensor 19, using a known algorithm, to thereby detect the position and the shape of the user's hand, and the transition of the shape of the user's hand, thus detecting the form of the hand gesture performed by the user. The controller 31 compares the form of the hand gesture detected as above with the prespecified hand gesture stored in advance in the storage device 18, and decides whether the detected hand gesture accords with, or is approximate to the prespecified hand gesture.

Figure 2:
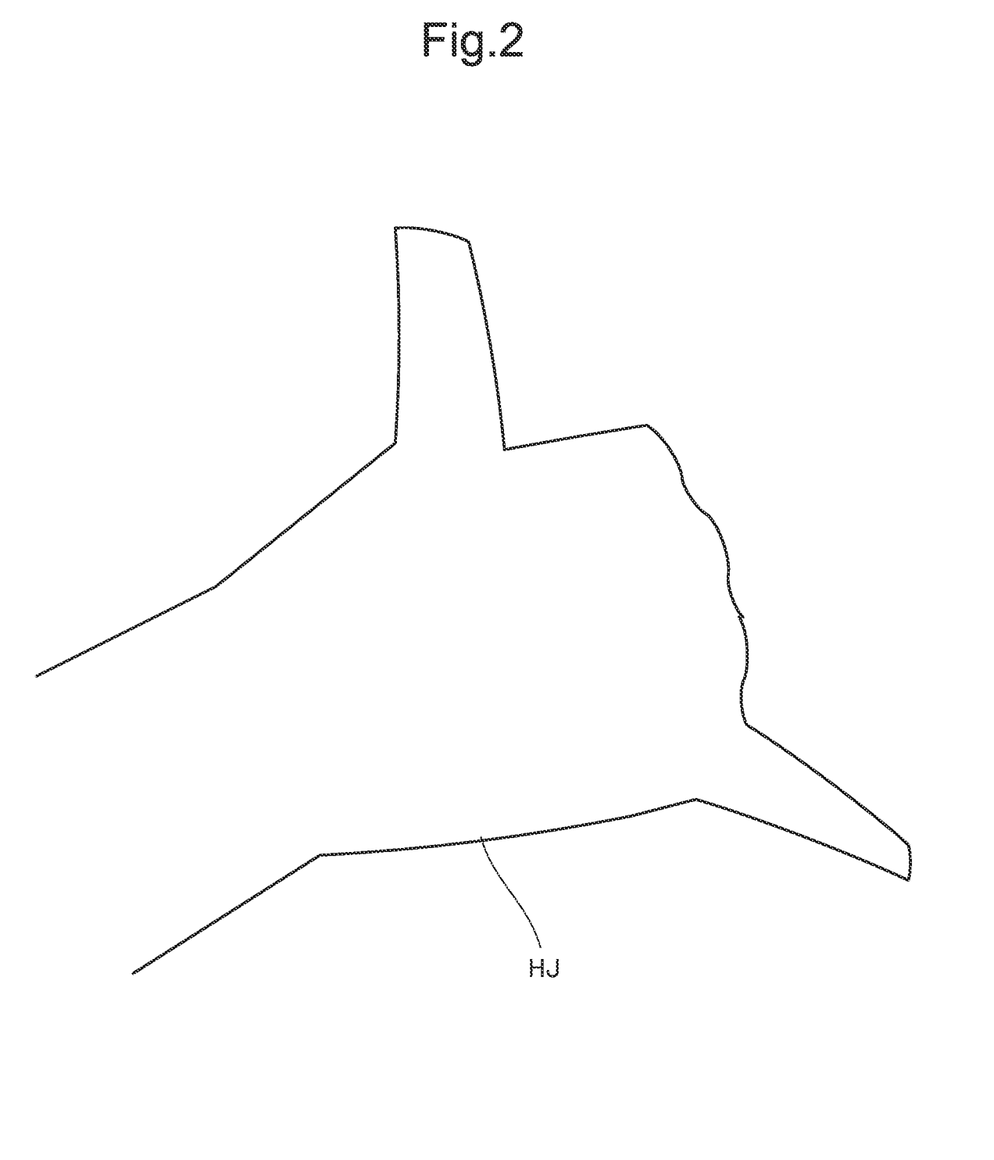
FIG. 2 is a schematic drawing showing a prespecified hand gesture.

For example, a prespecified hand gesture HJ representing the motion of making a phone call, as shown in FIG. 2, is stored in advance in the storage device 18. The controller 31 detects the form of the hand gesture performed by the user as above, from the shot image provided by the motion sensor 19, and decides whether the form of the detected hand gesture accords with, or is approximate to the prespecified hand gesture HJ stored in the storage device 18. When the detected hand gesture accords with, or is approximate to the prespecified hand gesture HJ, the controller 31 decides that the motion sensor 19 has detected the prespecified hand gesture HJ.

Here, the form of the prespecified hand gesture HJ differs depending on the age, nation, or region, and is therefore not limited to the form shown in FIG. 2, but may be a different form.

Figure 3:
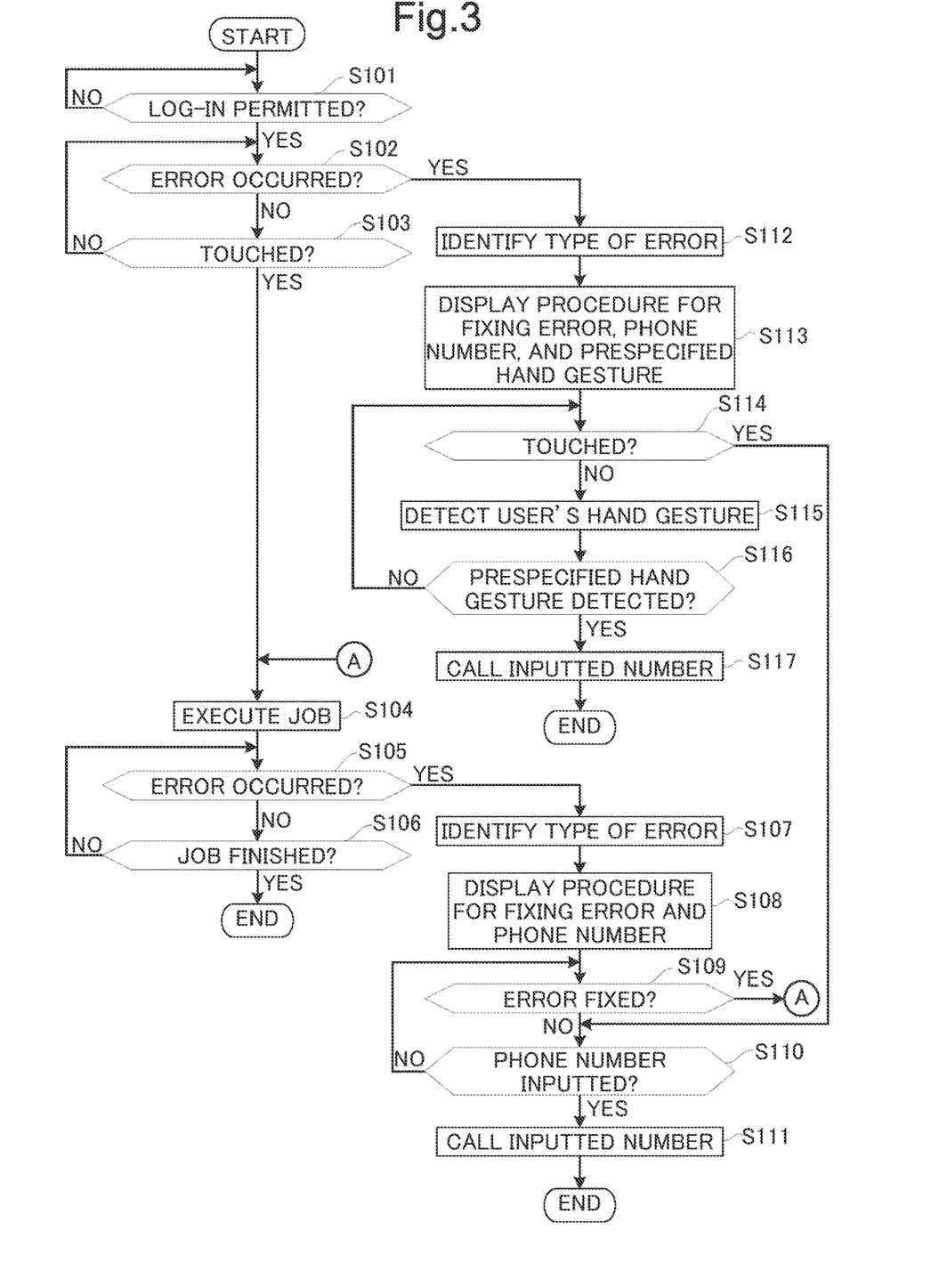
FIG. 3 is a flowchart showing an error fixing process.

Hereunder, the error fixing process will be described in further detail, with reference to the flowchart shown in FIG. 3.

The controller 31 is standing by for the log-in of the user (No at step S101). Upon deciding that the log-in password read by the card reader 22 from the user's ID card accords with the log-in password stored in advance in the storage device 18, the controller 31 permits the user to log-in in the image forming apparatus 10 (Yes at step S101). Here, a different log-in method may be employed, instead of the use of the ID card. From the viewpoint of public hygiene, it is preferable to adopt a log-in method that keeps the user from touching the image forming apparatus 10, such as non-contact log-in by face authentication. In the case where the log-in by face authentication is adopted, the image forming apparatus 10 additionally includes a camera for shooting the user's face. The controller 31 permits the user to log-in, when the image of the user's face shot by the camera accords with, or is approximate to the preregistered face image stored in advance in the storage device 18.

After permitting the log-in, the controller 31 decides whether an error has occurred in the image forming apparatus 10, on the basis of the output from each of the plurality of sensors (step S102). The controller 31 also decides whether an operation has been performed on the touch panel 12 or operation device 13 (step S103).

Unless it is decided that an error has occurred in the image forming apparatus 10 (No at step S102), the controller 31 executes the copying job or printing job (step S104), according to the user's operation performed through the touch panel 12 on the GUI displayed on the screen of the display device 11, or the input made through the operation device 13 (Yes at step S103).

The controller 31 decides whether an error has occurred in the image forming apparatus 10 during the execution of the copying job or facsimile job, on the basis of the output from each of the plurality of sensors (step S105). For example, the controller 31 detects, during the execution of the copying job, occurrence of jam of the source document or recording sheet, running out of the recording sheet, and running out of the toner, as the error. The controller 31 detects, during the execution of the facsimile job, occurrence of jam of the source document, and interruption of the facsimile communication, as the error.

The controller 31 decides whether the job that has been executed according to the instruction has ended (step S106, No at step S106). Upon deciding that the copying job or facsimile job has ended (Yes at step S106), without an error having occurred (No at step S105), the controller 31 finishes the error fixing process.

Upon deciding that an error has occurred (Yes at step S105), before finishing the copying job or facsimile job (No at step S106), the controller 31 identifies the type of the error, on the basis of the output from each of the plurality of sensors (step S107).

Figure 4:
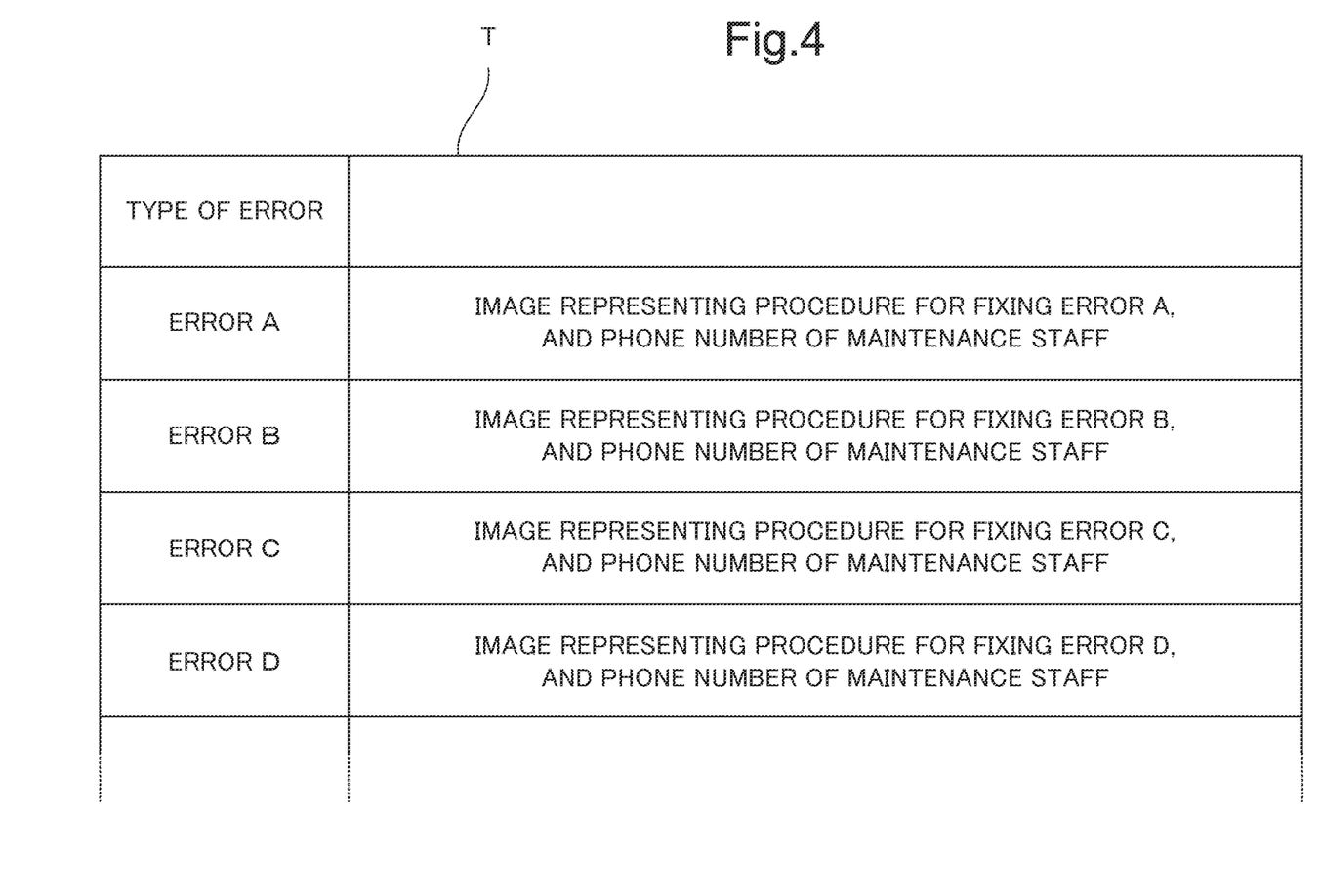
FIG. 4 is a schematic drawing showing a management table.

The controller 31 retrieves an image indicating an operation procedure for fixing the error of the type identified at step S107, and the telephone number of the maintenance staff, from a management table T stored in advance in the storage device 18. In the management table T, the image indicating the operation procedure (e.g., illustration) for fixing the error and the telephone number of the maintenance staff is registered, with respect to each of a plurality of types of errors, as shown in FIG. 4.

Upon retrieving the image indicating the operation procedure for fixing the error and the telephone number of the maintenance staff, from the management table T, the controller 31 causes the display device 11 to display the image representing the operation procedure and the telephone number that have been retrieved (step S108).

The user may either perform an operation according to the operation procedure displayed on the screen of the display device 11, to thereby fix the error and manually resume the copying job or facsimile job, or input the telephone number displayed on the screen of the display device 11, using the tenkey provided on the operation device 13.

The controller 31 decides whether the error has been fixed, according to the detection output of each of the plurality of sensors (step S109), and also decides whether the telephone number has been inputted to the operation device 13 (step S110).

Upon deciding that the error has been fixed (Yes at step S109), without the telephone number having been inputted to the operation device 13 (No at step S110), the controller 31 returns to step S104.

When the telephone number is inputted (Yes at step S110), without the error having been fixed (No at step S109), the controller 31 causes the communication device 14 to dispatch a call to the telephone set on the other end corresponding to the inputted telephone number, via the telephone network (step S111). Upon receipt of the answer to the dispatched call from the telephone set on the other end, the communication device 14 starts the communication between the telephone set 21 and the telephone set on the other end. Then the user can request the maintenance staff to fix the error, through the telephone. After step S111, the controller 31 finishes the error fixing process.

As described above, the copying job of printing job is executed, unless an error occurs after the user has logged in. If no error occurs during the execution of the job, the job is normally finished. When an error occurs during the execution of the job, the image indicating the operation procedure for fixing the error and the telephone number of the maintenance staff is displayed on the screen of the display device 11. The mentioned example represents the case where the user has touched the touch panel 12 or operation device 13 to execute the copying job or printing job, in other words the user is not performing the non-contact operation.

On the other hand, there may be cases where an error has already occurred, when the image forming apparatus 10 permits the user to log-in (Yes at step S101). For examples, the user may be permitted to log-in, despite that the error, which occurred during the copying job or printing job instructed by another user who logged in previously, has been left unfixed, because the other user moved away from the image forming apparatus 10.

In such a case, when the controller 31 decides that the error has occurred (Yes at step S102), without deciding that the touch panel 12 or operation device 13 has been touched by the user (No at step S103), the controller 31 identifies the type of the error, according to the detection output of each of the plurality of sensors (step S112). The controller 31 retrieves the image indicating the operation procedure for fixing the error of the identified type, and the telephone number of the maintenance staff, from the management table T stored in the storage device 18, and causes the display device 11 to display the image representing the operation procedure and the telephone number that have been retrieved. At the same time, the controller 31 causes the display device 11 to display the prespecified hand gesture HJ representing the motion of making a phone call as shown in FIG. 2 (step S113).

Thus, the mentioned example represents the case where the user becomes aware of the occurrence of the error, before inputting the instruction to execute the copying job or printing job by touching the touch panel 12 or operation device 13. In this case, the user may either touch the touch panel 12 or operation device 13 to input the instruction, or perform the prespecified hand gesture HJ, in view of the screen of the display device 11, in the imaging range of the motion sensor 19, instead of touching the touch panel 12 or operation device 13.

Upon deciding that the touch panel 12 or operation device 13 has not been touched (No at step S114), the controller 31 analyzes the image data representing the image of the user shot by the motion sensor 19, and the distance to the user detected by the motion sensor 19, to thereby detect the hand gesture performed by the user (step S115).

The controller 31 then decides whether the hand gesture detected at step S115 accords with, or is approximate to the prespecified hand gesture HJ representing the motion of making a phone call as shown in FIG. 2 (step S116).

Upon deciding that the hand gesture detected at step S115 accords with, or is approximate to the prespecified hand gesture HJ (Yes at step S116), the controller 31 analyzes the image displayed on the screen of the display device 11 to thereby detect a number of prespecified digits, and acquires the detected number as the telephone number of the maintenance staff. The controller 31 causes the communication device 14 to dispatch a call to the telephone set on the other end indicated by the acquired telephone number, via the telephone network (step S117). Upon receipt of the answer to the dispatched call from the telephone set on the other end, the communication device 14 starts the communication between the telephone set 21 and the telephone set on the other end. Then the user can request the maintenance staff to fix the error, through the telephone. After step S117, the controller 31 finishes the error fixing process.

Thus, in the case where the error has already occurred in the image forming apparatus 10, when the image forming apparatus 10 permits the user to log-in, or where the error has occurred in the image forming apparatus 10, after the permission to log-in, but before the user touches the touch panel 12 or operation device 13 to execute the copying job or printing job, the user can be aware of the occurrence of the error, and immediately perform the prespecified hand gesture HJ displayed on the screen of the display device 11, to thereby dispatch a telephone call to the maintenance staff, without the need to touch the touch panel 12 or operation device 13. In the case where the telephone set 21 is of the hands-free type, the user can request the maintenance staff to fix the error through the telephone, without touching any part of the image forming apparatus 10 at all.

In the case where, after displaying the prespecified hand gesture HJ on the screen of the display device 11 (step S113), (1) the controller 31 decides that the user has touched the touch panel 12 or operation device 13 (Yes at step S114), and (2) the controller decides that the user has touched the touch panel 12 or operation device 13 (Yes at step S114), after deciding that the hand gesture detected at step S115 does not accord with, or is not approximate to the prespecified hand gesture HJ (No at step S116), the controller 31 proceeds to step S110.

In this case, since the user has not refrained from touching the image forming apparatus 10, the controller 31 stands by for the user to input of the instruction through the touch panel 12 or operation device 13. Here, in the case where the controller 31 proceeds to step S110 from (1) and (2) above, and the telephone number is not inputted to the operation device 13, without the error having been fixed, the controller 31 stands by for the input of the telephone number to the operation device 13. When the telephone number is inputted, the controller 31 causes the communication device 14 to dispatch a call to the telephone set on the other end indicated by the inputted telephone number, via the telephone network (step S111).

The disclosure may be modified in various manners, without limitation to the configuration according to the foregoing embodiment. For example, in the case where an error has already occurred in the image forming apparatus 10 when the user is permitted to log-in, a call is dispatched to the predetermined telephone number in response to the prespecified hand gesture HJ, in the foregoing embodiment. However, the disclosure is not limited to such an arrangement. For example, the call may be dispatched to the predetermined telephone number, in response to the prespecified hand gesture HJ, also when an error occurs in the image forming apparatus 10, during the execution of the copying job or facsimile job.

In the foregoing embodiment, the controller 31 detects the number of prespecified digits in the image displayed on the screen of the display device 11, and acquires the detected number as the telephone number of the maintenance staff. However, the disclosure is not limited to such an arrangement. For example, the controller 31 may store the telephone number of the maintenance staff in the management table T in the storage device 18 in advance, and then acquire the telephone number of the maintenance staff from the management table T. In this case, the controller 31 may retrieve the telephone number of the maintenance staff from the management table T, upon deciding that the hand gesture detected at step S115 accords with, or is approximate to the prespecified hand gesture (Yes at step S116), and cause the communication device 14 to dispatch a call to the retrieved telephone number, via the telephone network (step S117).

Although the embodiment represents the case where the telephone call is dispatched according to the telephone number, the disclosure is similarly applicable to the case of dispatching a call to a facsimile number. When the disclosure is applied to dispatching a call to a facsimile number, the controller 31 causes the image reading device 16 to read the image of the source document placed on the contact glass, which is the object of the facsimile transmission, and generate the image data. Then the controller 31 causes the communication device 14 to transmit the generated image data, to the facsimile machine on the other end indicated by the predetermined facsimile number, corresponding to the predetermined condition.

Although the controller 31 specifies in advance the condition that an error has occurred in the image forming apparatus 10, as the predetermined condition in the foregoing embodiment, the disclosure is not limited to such an arrangement. For example, the controller 31 may specify in advance another condition that an image including numbers is being displayed on the display device 11, as the predetermined condition. Upon detecting the prespecified hand gesture on the basis of the image shot by the motion sensor 19, in the state where such another condition is satisfied, the controller 31 detects the number of the prespecified digits in the screen of the display device 11, acquires the detected number as the telephone number or facsimile number, and causes the communication device 14 to dispatch a call to the terminal device on the other end indicated by the acquired telephone number or facsimile number, via the telephone network.

For example, when the setting screen for the facsimile job is displayed on the screen of the display device 11, the controller 31 detects the number of the prespecified digits in the screen of the display device 11, and acquires the detected number as the facsimile number. To acquire the facsimile number, the controller 31 decides that the condition that the image including the number is displayed on the display device 11 is satisfied, and further causes the communication device 14 to dispatch a call to the facsimile machine on the other end indicated by the acquired facsimile number, via the telephone network, upon detecting a prespecified hand gesture indicating that the facsimile communication is to be executed, on the basis of the image shot by the motion sensor 19. Accordingly, the communication device 14 starts the facsimile communication with the facsimile machine on the other end via the telephone network, on the basis of the predetermined communication protocol, and transmits the image data, which is the object of the facsimile transmission, to the facsimile machine on the other end via the telephone network.

Further, the controller 31 may detect, upon detecting the prespecified hand gesture on the basis of the image shot by the motion sensor 19, when the image forming apparatus 10 is connected to the internet via the communication device 14, and a web browser including the number is displayed on the display device 11, the number of the prespecified digits in the web browser displayed on the display device 11, acquire the detected number as the telephone number or facsimile number, and cause the communication device 14 to dispatch a call to the terminal device on the other end indicated by the acquired telephone number or facsimile number, via the telephone network.

The configurations and processings described with reference to FIG. 1 to FIG. 4 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a motion sensor that detects a gesture of a user;
a communication device that includes a telephone set and makes communication with a telephone set on another end, through a predetermined communication network;
an operation device through which an instruction is inputted according to an operation of the user;
an image forming device that forms an image on a recording medium; and a control device including a processor, and configured to act, when the processor operates according to a control program, as a controller that causes the communication device to dispatch a call to the telephone set on another end indicated by a predetermined telephone number and start communication with the telephone set on another end, upon receipt of an answer to the dispatched call from the telephone set on another end, when the motion sensor detects a prespecified gesture, in a state where log-in in the image forming apparatus is permitted, the instruction has not been inputted to the operation device, and an error has occurred in the image forming device.

2. The image forming apparatus according to claim 1, further comprising a display device, wherein the controller displays an image including a number on the display device, in the state where log-in in the image forming apparatus is permitted, the instruction has not been inputted to the operation device, and the error has occurred in the image forming device.

3. The image forming apparatus according to claim 2, wherein the controller detects a number of prespecified digits in the image displayed on the display device, and acquires the detected number as the predetermined telephone number.

4. The image forming apparatus according to claim 3, wherein the controller causes the display device to display, as the image, a web browser screen including the number.

5. The image forming apparatus according to claim 4, further comprising a display device, wherein the controller causes the display device to display an image representing the prespecified gesture, in the state where log-in in the image forming apparatus is permitted, the instruction has not been inputted to the operation device, and the error has occurred in the image forming device.

* * * * *